United States Patent [19]

Warmack et al.

[11] Patent Number: 5,028,935

[45] **Date of Patent: * Jul. 2, 1991**

[54] WIDE FORMAT THERMAL RECORDING DEVICE

[75] Inventors: Ralph E. Warmack; Anne L. Moore; Ken W. Ricketts; Cecil R. Gilbreath, all of Houston, Tex.

[73] Assignee: Calcomp Group, Sanders Associates, Inc., Anaheim, Calif.

[ * ] Notice: The portion of the term of this patent subsequent to Aug. 2, 2006 has been disclaimed.

[21] Appl. No.: 931,057

[22] Filed: Nov. 17, 1986

[51] Int. Cl.[5] .......................... G01D 15/10; B41J 3/20

[52] U.S. Cl. ................................ 346/76 PH; 400/120

[58] Field of Search .................... 346/76 PH; 400/120

[56] References Cited

U.S. PATENT DOCUMENTS

| | | | |
|---|---|---|---|
| 3,161,457 | 12/1964 | Schroeder et al. | 346/76 PH |
| 3,453,648 | 7/1969 | Stegenga | 346/76 PH |
| 3,578,946 | 5/1971 | Colello | 219/216 |
| 4,213,135 | 7/1980 | Medvecky | 346/76 PH |
| 4,534,814 | 8/1985 | Volpe et al. | 156/300 |
| 4,651,164 | 3/1987 | Abe et al. | 346/76 PH |

*Primary Examiner*—E. A. Goldberg

*Assistant Examiner*—Gerald E. Preston

*Attorney, Agent, or Firm*—Finnegan, Henderson, Farabow, Garrett & Dunner

[57] ABSTRACT

A wide format thermal printhead is provided which comprises a baseplate; a first substrate with a border portion removed from a first edge thereof to form a second edge, the first substrate being mounted on the baseplate; and a second substrate with a border portion removed from a first edge thereof to form a second edge, the second substrate being mounted on the baseplate with the second edge of the second substrate abutting the second edge of the first substrate to form a print surface having an extended active print width. Also provided is a thermal recording device with wide format capabilities which comprises the wide format thermal printhead as described.

15 Claims, 4 Drawing Sheets

WIDE FORMAT THERMAL RECORDING DEVICE

BACKGROUND OF THE INVENTION

1. Field of the Invention

The present invention relates to thermal recording devices and methods for manufacture of the printheads used in these devices. More specifically, the invention relates to thermal plotting/printing devices having extended active print width and thus having wide format capabilities. The method of the present invention specifically relates to the manufacture of thermal printheads having extended active print width.

2. Description of the Related Art

Thermal recording devices are devices which use a thermal printhead containing a matrix of small heating elements called dots, nibs or stylli to selectively provide heat to a localized region of a ribbon or recording medium, thereby causing an image to be recorded onto the recording medium. Two types of thermal recording devices are commonly known—thermal transfer devices and direct thermal transfer devices. In thermal transfer devices, a thermal printhead is used to selectively heat an ink-bearing ribbon which transfers the ink to the recording medium (generally ordinary paper). Direct thermal transfer devices use a heat-sensitive recording medium, such as chemically treated paper, which produces the recorded image when selectively heated by a thermal printhead.

In either case, the thermal recording device comprises a thermal printhead and a platen roller with a surface of the platen roller contacting the printhead. The recording medium, and the ribbon in a thermal transfer device, are passed between the printhead and the platen roller so that the recording medium, or the ribbon in a thermal transfer device, is forced against the printhead by the platen roller as the recording medium is moved over the printhead.

A conventional printhead is typically comprised of a substrate base, one surface of which contains a plurality of stylli. The individual stylli may have a dot-type geometry, a serpentine or meandering geometry, or other suitable form. The stylli are positioned on the substrate to form a pattern, typically conforming to a linear matrix arrangement. The printhead includes a bus arrangement which selectively provides electrical energy from an external power supply to the individual stylli in accordance with input signals from a data source. Data source, as that term is used herein, is a device which provides data in the form of electrical signals to be plotted or printed by the thermal recording device. Examples of data sources include microprocessors, process instrumentation, and monitoring devices.

The bus arrangement of the printhead generally includes electrical contacts or leads coupled to the individual stylli. Bus lines are coupled to the leads and run to an external interface circuit which serves a data receiving and switching function. The external interface circuit selectively switches electric current to certain ones of the individual stylli in accordance with the data source input as the recording medium is moved past the printhead, thereby thermally recording the image on the recording medium.

A design for a conventional thermal printhead substrate and method of manufacture are described in U.S. Pat. No. 3,578,946. The stylli are comprised of semiconductor elements on highly resistive substrate base wafers. They are formed by depositing a semiconductor layer on the surface of the substrate base wafer. The semiconductor material is then divided into spaced, parallel, resistive elements by applying a mask and spraying with an abrasive material. Electrical leads are attached to the semiconductor elements by vapor deposition or other conventional means. The wafers thus formed are combined with dielectric wafers in a sandwich-type arrangement to form a printhead substrate. This substrate, when combined in a housing with a switching means such as the external interface circuit discussed above, constitutes a conventional printhead.

The term printhead substrate or substrate as used herein refers to the portion of a thermal printhead including the substrate base, the stylli attached to or integrated into the substrate, the leads, bus structure, and data receiving and switching circuits.

The recording medium is moved between the printhead and the platen roller, and thus over the printhead, in a direction perpendicular to the axis of the platen roller. The width of the device as that term is used herein refers to the linear dimension along the longitudinal axis of the platen roller. The width of the printhead is the width of the substrate surface contacting the ribbon or the recording medium. The active print width is the width along the printhead measured from the first row of active stylli to the last row of active stylli, and thus corresponds to the width of the recording medium for which an image can be directly created by the printhead. Active print depth is the linear dimension of the printhead perpendicular to the print width and parallel to the direction of paper movement for which there are active stylii of about 1.0 mm (0.04 in.).

Thermal recording devices have become increasingly important in recent years as development of the underlying technologies has progressed and new applications have been found. Some of these new applications have created the demand for wide format devices. For example, it is typically necessary in a number of fields to compare the values of several variables relative to the value of one or more independent variables, such as time. This comparison can be greatly facilitated by plotting the data using a strip chart-type format. However, the width of the ordinate axis for each variable plotted must be sufficient to discern small variations in the value of the respective variable. Thus, there is demand for a thermal plotter/printer with wide format capabilities sufficient to accomodate plots of several variables while providing for small variations in the value of each variable. Examples of applications requiring wide format capabilities include seismic analysis of geologic structures, patient monitoring and other medical applications, and monitoring of performance parameters for aircraft, spacecraft, missiles, and remotely piloted vehicles. CAD/CAM applications similarly may require wide format plotting and printing for adequate resolution of detail.

Thermal printheads of conventional design have been limited in width primarily by the fragile character of the substrates. The susceptibility of the substrate to breakage increases with increasing length. This has had the practical effect of limiting the maximum length of such conventional printheads to about 25 cm (10 inches).

It is an object of the present invention to provide a thermal recording device having wide format capabilities. It is further an object of the present invention to provide a thermal printhead with an extended active print width. It is still further an object of the present invention to provide a method of manufacture of a thermal printhead having an extended active print width.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, a wide thermal printhead is provided which comprises a baseplate; a first substrate with a border portion removed from a first longitudinal edge thereof to form a second edge, thereby providing active stylli within close proximity of the second edge of the first substrate, the first substrate being mounted on the baseplate; and a second substrate with a border portion removed from a first longitudinal edge thereof to form a second edge, thereby providing active stylli wityin close proximity of the second edge of the second substrate, the second substrate being mounted on the baseplate with the second edge of the second substrate abutting the second edge of the first substrate to form a printing surface having an extended active print width.

The first substrate comprises a first power supply and first substrate driving circuitry for receiving data and selectively switching power from the first power supply to selected ones of the stylli in accordance with data, and the second substrate comprises a second power supply and second substrate driving circuitry for receiving data and selectively switching power from the second power supply to selected ones of the stylli in accordance with the data. The first and second power supplies may optionally be combined into a single power supply.

Further to achieve the foregoing objects, and in accordance with the purposes of the invention as embodied and broadly described herein, a thermal recording device with wide format capabilities is provided which comprises a body member; a thermal printhead mounted in the body member, the printhead including a baseplate, a first substrate with a border portion removed from a first longitudinal edge of the first substrate to form a second edge, thereby providing active stylli within close proximity of the second edge of the first substrate, the first substrate being mounted on the baseplate; and a second substrate with a border portion removed from a first longitudinal edge of the second substrate to form a second edge, thereby providing active stylli within close proximity of the second edge of the second substrate, the second substrate being mounted on the baseplate with the second edge of the second substrate abutting the second edge of the first substrate to form a printing surface having an extended active print width; device driving circuitry to receive data from a data source, translate the data into electrical signals, and provide the electrical signals to the first and second substrates to selectively energize the active stylli of the first and second substrates; recording medium supply means mounted in the body member for supplying recording medium to the thermal printhead; a platen roller mounted in the body member and having an outer surface for contacting the recording medium and applying a force to the recording medium to hold the recording medium against the thermal printhead; and recording medium driving means to move the recording medium across the thermal printhead.

The first substrate comprises a first power supply and first substrate driving circuitry for receiving data and selectively switching power from the first power supply to selected ones of the stylli in accordance with data, and the second substrate comprises a second power supply and second substrate driving circuitry for receiving data and selectively switching power from the second power supply to selected ones of the stylli in accordance with the data. Again, the first and second power supplies may optionally be combined into a single power supply. The driving circuitry comprises an input controller for receiving data from a data source and storing the data in an input buffer; a formatter for receiving the data from the input controller and translating the data into a format useable by the thermal printhead; an output controller to receive the formatted data from the formatter and to store the formatted data in an output buffer, the output controller further being adapted to strobe the formatted data from the output buffer to the thermal printhead.

The input controller comprises a character generator for generating print characters when the device is in a print mode. The platen roller has a surface formed of an elastomeric material, preferably a rubber material.

The recording medium driving means comprises a stepping motor mounted in the body member and mechanical coupling means for mechanically coupling the stepping motor with the platen roller to incrementally and controllably move the recording medium across the thermal printhead.

Still further to achieve the foregoing objects, and also in accordance with the purposes of the invention as embodied and broadly described herein, a method of manufacturing a wide format thermal printhead is provided which comprises a first step of removing a border portion from a first longitudinal edge of a first substrate to form a second edge, thereby providing active stylli within close proximity of the second edge of the first substrate; a second step of removing a border portion from a first longitudinal edge of a second substrate , to form a second edge, thereby providing active stylli within close proximity of the second edge of the second substrate; a third step of mounting the first and second substrates on a baseplate so that the second edge of the first substrate abuts the second edge of the second substrate to form a plotting/printing surface which is substantially planar and in which the stylli of the first and second substrates form a substantially uniform pattern.

The removal of the respective border portions in the first and second steps may comprise at least one of the processes of dicing, grinding, and polishing.

The first and second steps may include a first substep of polishing the bottom surface opposite the stylli bearing surface of the first and second substrates to obtain substantially flat surfaces, and the third step may comprise a first substep of polishing the top surface of the baseplate to obtain a substantially flat surface.

The mounting process of the third step may include the use of bonding means, which may comprise at least one of a double-sided adhesive tape, an epoxy, and a cement. In addition or alternatively, the mounting process of the third step may include the use of fastening means, which may comprise a plurality of screws extending through a border portion of the printing surface of the first and second substrates and into threaded holes in the baseplate.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

DESCRIPTION OF THE PREFERRED EMBODIMENT

Reference will now be made in detail to the present preferred embodiment of the invention as illustrated in the accompanying drawings and set forth in the appended claims.

Figure 1A:
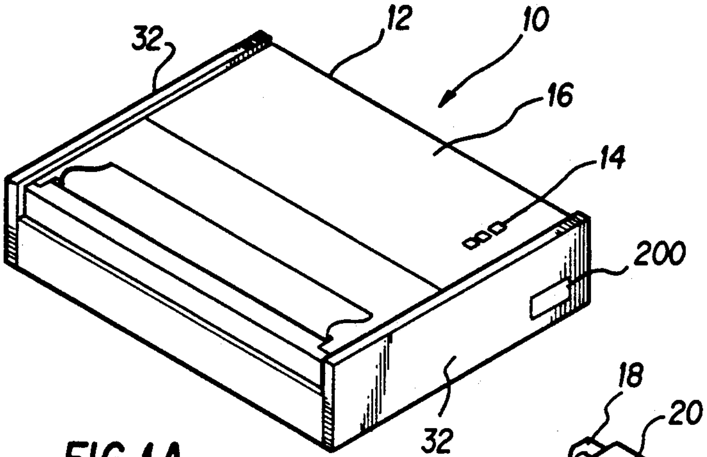
FIG. 1A shows a perspective view of a thermal recording device in accordance with the present invention in a table-top configuration.
Figure 1C:
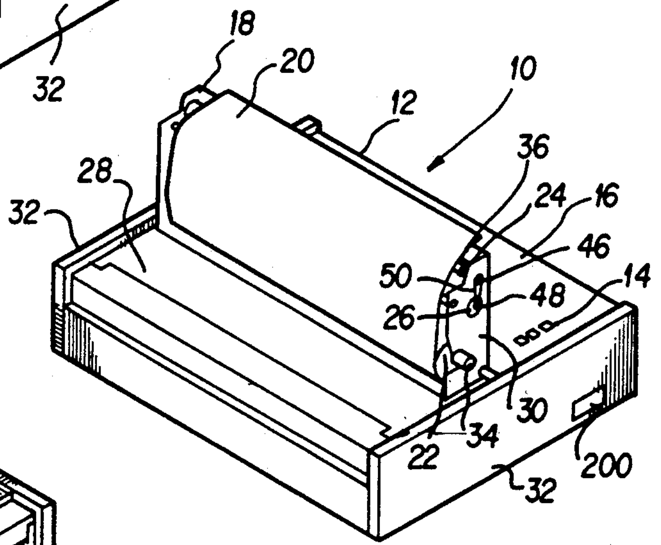
FIG. 1C is a perspective view of the thermal recording device in accordance with the present invention which shows the hinged transport assembly in an open position.
Figure 1B:
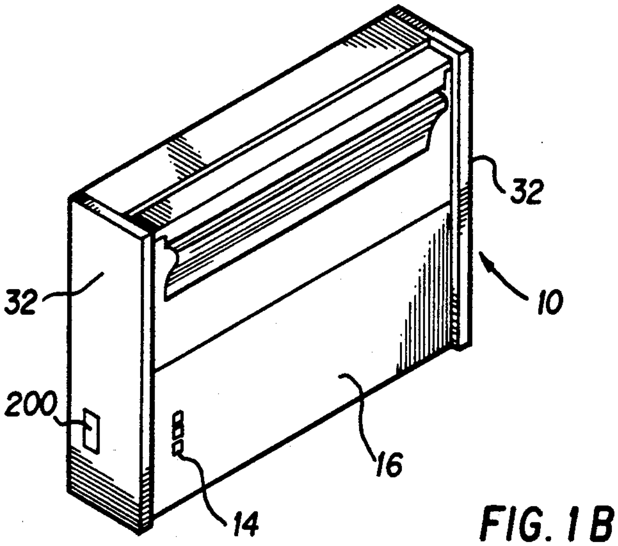
FIG. 1B is a perspective view of the thermal recording device in accordance with the present invention in a wall-mount configuration.

A thermal recording device 10 according to the preferred embodiment of the present invention is shown in FIGS. 1A and 1B, which show the device in table-top and wall-mount configurations, respectively. Externally, the device comprises a body member 12 and a control panel 14. The body member 12 is of conventional design and comprises a rigid box-type container. The control panel 14 is mounted into a surface 16 of the body member 12 which facilitates access and ready viewing. The control panel 14 includes switches and indicators for operating the device, such as power switch and indicator, on-line switch and indicator, line-feed switch, page feed switch, paper low indicator, and self-test switch.

The body member 12 includes a hinged transport assembly 18 which is incorporated into a surface 16 of the body member as shown in the open position in FIG. 1C. The hinged transport assembly 18 facilitates resupply of the recording medium 20 and access to the internal components for maintenance and repair. A recording medium supply roll 22, platen roller 24, and stepping motor 26 are mounted on the hinged transport assembly 18.

The thermal recording device 10 may be a thermal transfer device or a direct transfer device. In the thermal transfer device embodiment, a ribbon feed roll and ribbon take up roll (not shown) are disposed to provide an ink ribbon sheet across the thermal printhead 28 (described below). The ribbon feed roll and take up roll may be mounted on spools rotatably fastened to the side panels 30 of the hinged transport assembly 18. Alternatively, the spools may be fastened to the adjacent side walls 32 of the body member 12.

In both the thermal transfer device embodiment and the direct transfer embodiment, the recording medium 20, preferably recording paper, is wound onto the recording medium supply roll 22 which in turn is mounted on a spool 34. The spool 34 is detachably and rotatably mounted to the side panels 30 of the hinged transport assembly 18. The recording medium supply roll 22 supplies the recording medium 20 to the printhead for plotting or printing.

The recording medium 20 in the thermal transfer device embodiment is typically conventional paper sheet. The configuration of the ribbon feed and take up rolls is such that the ribbon sheet is fed between the printhead 28 and the recording medium 20, and the recording medium 20 is fed between the ribbon sheet and the platen roller 24.

The thermal recording device 10 of the preferred embodiment is a direct transfer device which uses commercially-available, chemically-treated, heat-sensitive paper approximately 504 mm (19.8 inches) wide as the recording medium 20. The paper is wound onto the recording medium supply roll 22, and the supply roll 22 is mounted to the side panels 30 of the hinged transport assembly 18. This embodiment does not include an ink ribbon or its feed and take up rolls.

Figure 2:
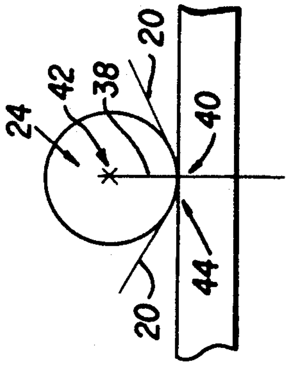
FIG. 2 shows the platen roller for the devices of FIGS. 1A–C positioned over the thermal printhead.

The platen roller 24 is rotatably mounted into the side panels 30 of the transport assembly 18 so that the longitudinal outer surface 36 of the platen roller 24 contacts the printhead 28 along a line 40 corresponding to the width dimension of the latter when the hinged transport assembly 18 is in a closed position. Preferably, the stylli on the printhead 28 are located in a plane 38 intersecting the center of rotation or longitudinal axis 42 of the platen roller 24 and normal to the printhead print surface 44, as shown in FIG. 2. The outer surface 36 of the platen roller 24 is comprised of an elastomeric material, preferably a rubber material, which resiliently applies a force on the printing surface 44 of the printhead.

Figure 3:
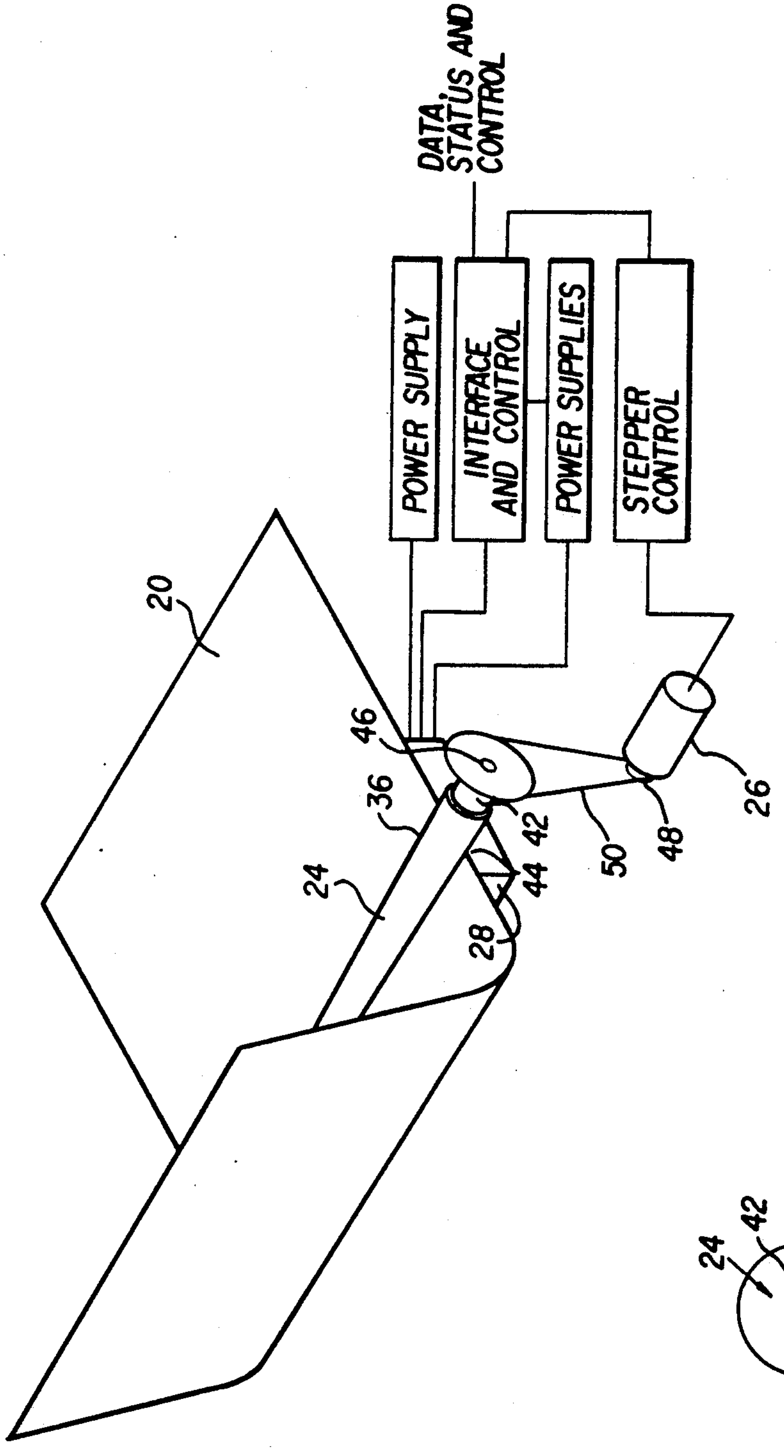
FIG. 3 illustrates selected internal components of the thermal recording devices of FIGS A–C.

As shown in FIGS. 1C and 3, a stepping motor 26 are mounted on a side panel 30 of the hinged transport assembly 18 and is mechanically coupled to the platen roller 24. The stepping motor 26 of the preferred embodiment is an electrically-driven micro-stepping motor which steps the recording medium 20 in 0.5 mils (0.001 mm) increments with a slew rate (length of paper advanced per unit time) of about 10 cm per second (4 inches per second). The end portion of the axle 46 of the platen roller 24 is coupled to the drive shaft 48 of the stepping motor 26 by conventional mechanical coupling means 50, such as a belt and pulley or chain and sprocket arrangement.

The thermal printhead 28 is rigidly mounted in the body member 12 with its printing surface 44 facing outwardly toward the platen roller 24 and the plane of the surface 16 of the body member 12 containing the hinged transport assembly 18. As noted above, the printhead 28 is mounted so that it contacts the surface 36 of the platen roller 24 when the hinged assembly 18 is closed. A line along the surface 36 of the platen roller 24 parallel to its longitudinal axis 42 contacts the printing surface 44 of the printhead 28 along its width.

The active print width of the thermal printhead 28 of the present invention is significantly greater than that of printheads known in the prior art. As discussed above, the maximum active print width of commercially-available thermal printheads has been about 25 cm (10 inches). The thermal printhead 28 of the preferred embodiment comprises two conventional substrates joined in an abutting fashion to produce a single printhead with an active print width of up to 50 centimeters (20 inches).

The printhead 28 of the preferred embodiment contains 3968 stylli with dot density of 8 dots/mm (203 dots/inch) along the print width. Each individual stylus has dimensions of 0.100 mm×0.170 mm (0.004 in.×0.007 in.). The intersticial spacing between the stylli is approximately 20 to 30 microns and, thus, the center-to-center distance between the stylli is approximately 120 to 130 microns along the printhead width.

Each of the substrates 100 and 102 of the printhead 28 has its individual driving circuitry, substantially that of the original substrates. Each substrate contains an external interface circuit which comprises a set of shift registers, a set of latches, a clock input line, a strobe input line, a data-in line, a load line, and one or more power supply lines. Both substrates 100 and 102 may be provided with a common power supply line. However, the printhead 28 of the preferred embodiment provides separate power supply lines to each of the substrates, in part for the following reason. It has been noted that the slew rate of the device 10 is about 10 cm/sec (4 in./sec.). This is significantly faster than convertional thermal recording devices. This enhanced slew rate is obtained by increasing the clock speed of the device 10 and reducing the duty cycle of the signals. These narrower clock pulses reduce the average power. To offset this effect, each substrate is provided with a separate power supply line, which improves the power rating of the device at the enhanced clock speed.

The design and construction of the thermal printhead 28 in accordance with the present invention is best understood in light of the method of printhead manufacture according to the present invention, a preferred illustration of which will now be described with reference to FIGS 4A–B.

The process of manufacture begins with two conventional substrates 100 and 102. A prototype of the thermal printhead 28 of the preferred embodiment was manufactured using Panatech/Ricoh Model RH-B48-02 thin film thermal printhead substrates. Each stylli-bearing substrate measures 27.6 cm×6.8 cm (10.7 in.×2.7 in.). Each substrate has an active print width 104 of 25.6 cm (10.1 in.). The dot density is 8 dots per mm (203 dots per inch) along the print width 104, and each substrate contains a total of 2048 dots or stylli in its active print region 108. There is a border portion or region 110 of about 1.0 cm (0.4 in.) between the first and last rows of stylli and the edges of the substrates on the longitudinal ends 112 of the substrates, the ends corresponding to the width dimension of the substrate.

The first step of the preferred method ; comprises removing the border portion 110 at a first edge 114 of the first substrate 100 to form a second edge 116 so that active stylli are within close proximity of the newly formed second edge of the first substrate 100. This step can be accomplished by, for example, by dicing the border region 110 at the first edge 114, grinding the newly created surface at the second edge 116, and polishing the surface to a smooth texture. These processes may be carried out using conventional machinery. Some of the stylli may be removed or damaged by the removal process. However, this may be tolerated so long as the remaining active stylli form a substantially straight row along and near the newly formed second edge of the substrate.

The second step comprises removing the border portion 110 at a first edge 118 of a second substrate 102 to form a second edge 120 so that active stylli are within close proximity of the newly formed second edge 120 of this second substrate 102, exactly as described for the first substrate 100 in the first step.

The third step of the method comprises mounting the first and second substrates 100 and 102 on a common baseplate 122 so that the second edge 116 of the first substrate 100 abuts the second edge 120 of the second substrate 102 to form an active plotting/printing surface 44 which is substantially planar and in which the stylli of both substrates form a dot pattern that is substantially uniform. The baseplate 122, which serves as a rigid mounting surface for the substrates 100 and 102 and as a heat sink for heat generated by the stylli during operation, is composed of a solid material with high electrical and thermal resistivity. The baseplate material preferably also has low linear and volumetric expansivity, and is preferably matched with that of the substrates 100 and 102 to avoid dislodging forces when the printhead temperature changes. In the preferred embodiment, the baseplate 122 is a porcelain or ceramic wafer which is coated with an epoxy to seal the pores of the wafer. The baseplate 122 is provided with a substantially flat mounting surface 124, such as by polishing. This flat surface is critical to obtaining a flat plotting/printing surface 44.

The first and second substrates 100 and 102 may be mounted on the baseplate mounting surface 124 in a number of ways. For example, bonding materials such as an epoxy or cement may be used. Alternatively or additionally, fastening means (not shown) may be provided to secure the substrates 100 and 102 to the baseplate mounting surface 124. For example, eight screws, one for each corner of each of the first and second substrates 100 and 102, may be extended through bore holes in the border portion 110 of the printing surface and into anchoring threads in the baseplate 122. These screws may be used to adjust the tension on the respective substrates, thereby further aligning the substrates. In the preferred embodiment, a double-sided adhesive bonding tape 126 of substantially uniform thickness is applied to the baseplate mounting surface 124. The first substrate 100 is then placed onto the tape-covered baseplate mounting surface 124 with its second edge 116 positioned in the center of the baseplate 122. Accordingly, substrate 100 is adhesively bonded to baseplate 122 by the bonding tape 126. The second substrate 102 is subsequently placed immediately adjacent the first substrate 100 so that the second edge 116 of the first substrate 100 abuts the second edge 120 of the second substrate 102. The second substrate 102 is also adhesively bonded to the baseplate 122 by the bonding tape 126.

During the emplacement of the first substrate 100, and especially during the emplacement of the second substrate 102 to abut the first substrate 100, care must be taken to align the substrates so that the respective second edges 116 and 120 are mated along the entire seam of their jointure, and so that the rows of stylli along the print width on the respective substrates form a substantially straight print line.

It will be recognized by those with ordinary skill in the art that the order of carrying out the third step may be varied without departing from the spirit of the invention. For example, the bonding tape 126 may first be applied to the substrates 100 and 102 rather than to the baseplate mounting surface 124. Also, the substrates 100 and 102 may be positioned relative to one another prior to placing them on the baseplate mounting surface 124.

Proper alignment of the substrates 100 and 102 is critical to obtaining a uniform dot pattern for the wide format printhead 28. It also avoids excessive wear on the printhead 28. Furthermore, it reduces the buildup of paper fibers and other contaminants at discontinuities in the printhead 28, which can also be avoided by using a recording medium with a smooth, glossy surface. Proper alignment requires that the substrates 100 and 102 be mounted to form a flat, straight, nonrotated combination as these terms are defined immediately below with reference to FIGS. 5A through 5C.

Figure 5A:
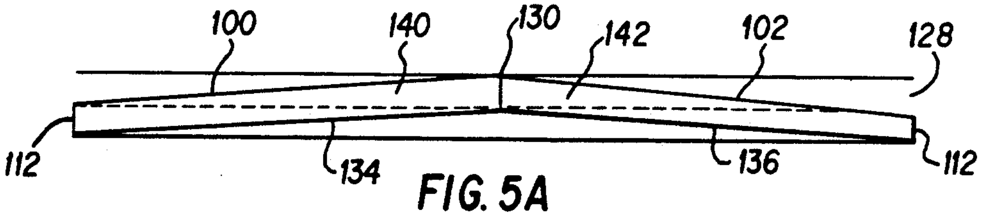
FIGS. 5A and 5B show the first and second substrates of the thermal printhead of FIG. 4B combined to form a surface that deviates from a flat surface positively and negatively, respectively.
Figure 5B:
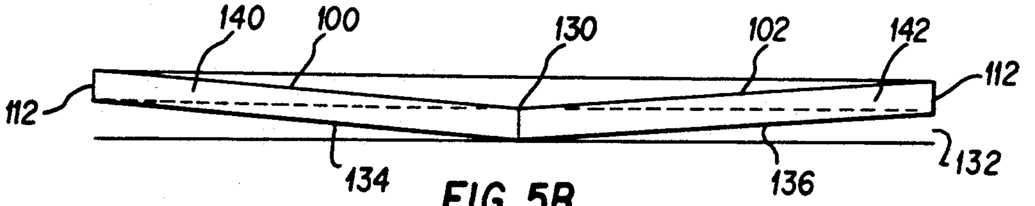

The concept of flatness is illustrated by FIGS. 5A and 5B, and refers to the deviation of the active print surface 44 of the combined substrates 100 and 102 along their width from a perfectly linear, smooth surface. A positive deviation 128 from a flat surface as illustrated by FIG. 5A results in non-uniform pressure of the stylli on the recording medium 20 at the center 130 of the printhead 28, thus causing a nonuniformity in the size and intensity of the resultant image dots on the recording medium 20 from across the print width. A positive deviation also causes the center 130 of the printhead 28 to experience excessive wear.

A negative deviation in flatness 132 as illustrated by FIG. 5B will also result in a nonuniformity in the intensity of the image. In this case, the image will be lighter at the center 130 of the printhead 28 due to the decreased pressure of the platen roller 24 along this region of the printhead.

Several measures can be taken to obtain a flat surface. As previously discussed, the baseplate mounting surface 124 is preferably treated, such as by polishing, to ensure that it is substantially flat. Similarly, the substrates 100 and 102 themselves are preferably similarly treated such as by polishing their respective under surfaces 134 and 136 (contacting the baseplate mounting surface 124) to obtain substantially flat, planar surfaces. It was noted above that the bonding material 126 is preferably of highly uniform thickness. All materials and surfaces must be kept clean and free of contaminants during the manufacturing process. Temperature variations in the materials are also preferably avoided. Using all of these techniques, a flatness deviation of plus or minus 2 to 5 microns has been achieved.

Figure 4A:
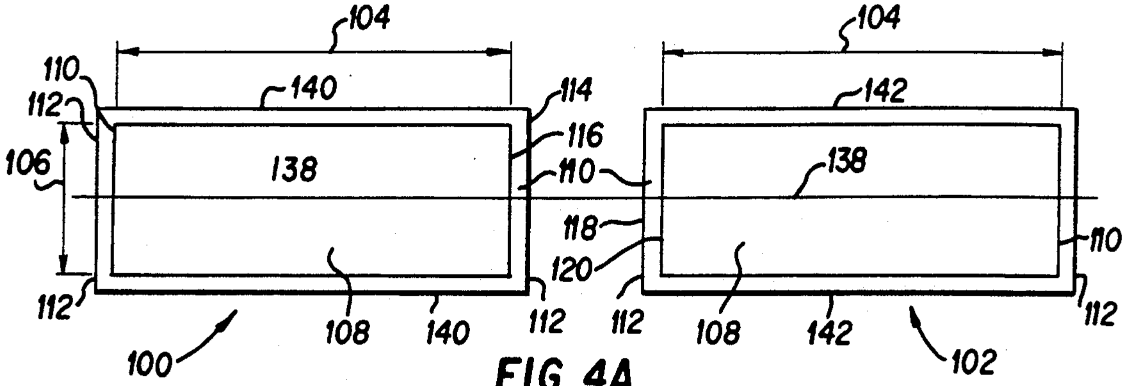
FIG. 4A is a top view of the first and second substrates of a printhead in accordance with the present invention prior to mounting of these substrates to a baseplate.
Figure 4B:
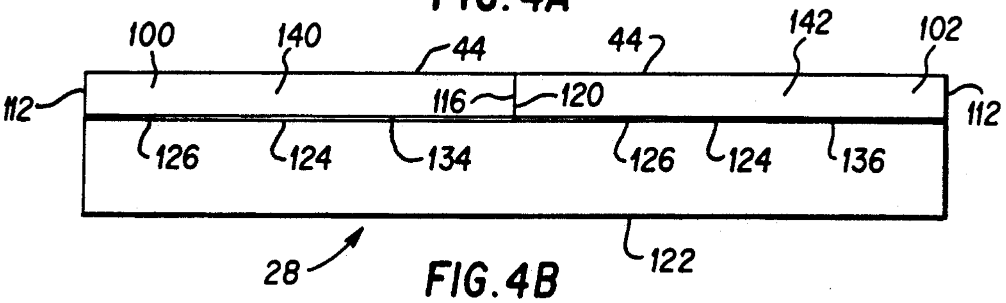
FIG. 4B is a side view of a thermal printhead in accordance with the present invention.
Figure 5C:
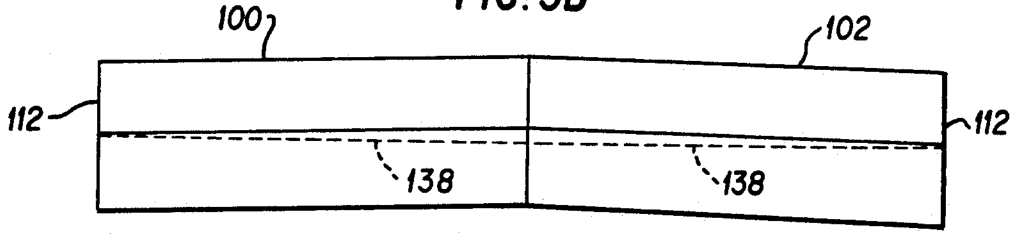
FIG. 5C illustrates the first and second substrates of the thermal printhead of FIG. 4B combined to illustrate the concept of straightness.

Straightness as that term is used here refers to the correspondence 100 and 102 of the active print regions 108 of the respective first and second substrates 100 and 102 to an imaginary line 138 extending down the center of the active print regions 108 along the width dimension of the printhead 28, as illustrated in FIGS. 4A and 5C. Straightness is achieved by closely adhering to the requirement that the respective second edges 116 and 120 of the first and second substrates 100 and 102 be substantially perpendicular to the imaginary line 138. Straightness is also achieved by placing the respective longitudinal side walls 140 and 142 of the first and second substrates 100 and 102 against a common straight-edged surface (not shown) positioned on or near the baseplate 122 substantially perpendicular to the mounting surface 124 thereof. The straight-edged surface serves as a mechanical guide to slidably align and secure the first and second substrates 100 and 102 as they are positioned onto the baseplate mounting surface 124.

Figure 5D:
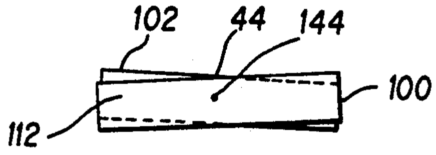
FIG. 5D shows the first and second substrates combined in a rotated fashion.

The term nonrotated as used herein refers to the absence of rotation of the first and second substrates 100 and 102 relative to one another along an imaginary axis of rotation 144 extending longitudinally through the center of the substrates 100 and 102, and thus through the center of the respective longitudinal end faces 112 of the substrates 100 and 102, as illustrated by FIG. 5D. Rotation of the substrates is avoided in the same manner described above to achieve flatness. The baseplate and lower surfaces of the substrates are preferably polished flat, and the bonding material must be of substantially uniform thickness.

In addition to proper alignment of the substrates, excessive wear on the printhead 28 can be avoided by refinements to the platen roller 24 design. Platten rollers for thermal recording device applications typically have a rubber material with about a 3 mm (0.12 in.) thickness which forms the surface 36 of the platen roller. An elastomeric material is used so that it will flex when counterforces such as mechanical vibrations are applied or when transient variations in platen roller movement occur, thus reducing wear and avoiding damage to the printhead. The surface hardness of typical rubber platen rollers, measured by the conventional durometer test method, is about 35°-45°. The rubber surface of the platen roller applies a force on the printhead typically in the range of 300–400 g/cm (0.7–0.9 lb./in.), measured as the mass or force per unit length applied along the line 40 of platen roller-to-printhead contact down the width dimension.

The platen roller 24 of the preferred embodiment was modified to have an increased rubber thickness of about 4 mm (0.16 in.) and a reduced hardness of 30°-35°. The platen roller force on the printhead 28 was also reduced to the 250–300 g/cm range. These refinements resulted in reduced wear on the printhead 28 and greater tolerance for printhead misalignment while maintaining good quality plots and printed text.

A gap or crevice typically appears between the stylli patterns of the first and second substrates 100 and 102 after they have been mounted in an abutting fashion. This is due at least in part to the small dimensions of the stylli and the difficulty of removing the border portion 110 of the substrates right up to the active stylli without rendering some of the stylli at the periphery of the border portion 110 inoperative. When the respective second edges 116 and 120 of the first and second substrates 100 and 102 are joined, the inactive stylli on the first and second substrates become contiguous and result in the gap or crevice.

Figure 6A:
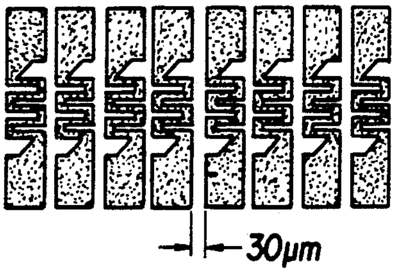
FIGS. 6A and 6B illustrate uniform dot spacing and a 100-micron gap in dot spacing of the printhead of FIG. 4B.
Figure 6B:
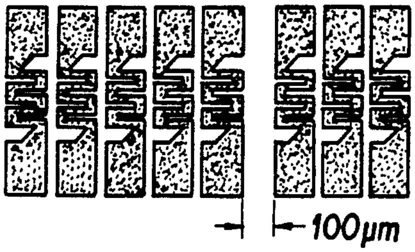

While it is difficult to entirely eliminate this gap, it may be reduced in size to approximately 75 microns using the method of the present invention as described above. A gap of 75 microns is perceptible under ordinary viewing conditions as a missing line and is acceptable for many applications. This is illustrated by FIGS. 6A and B, which show a block of stylli with the standard 30-micron spacing (FIG. 6A) compared with a block of stylli having a 100-micron gap.

Figure 7:
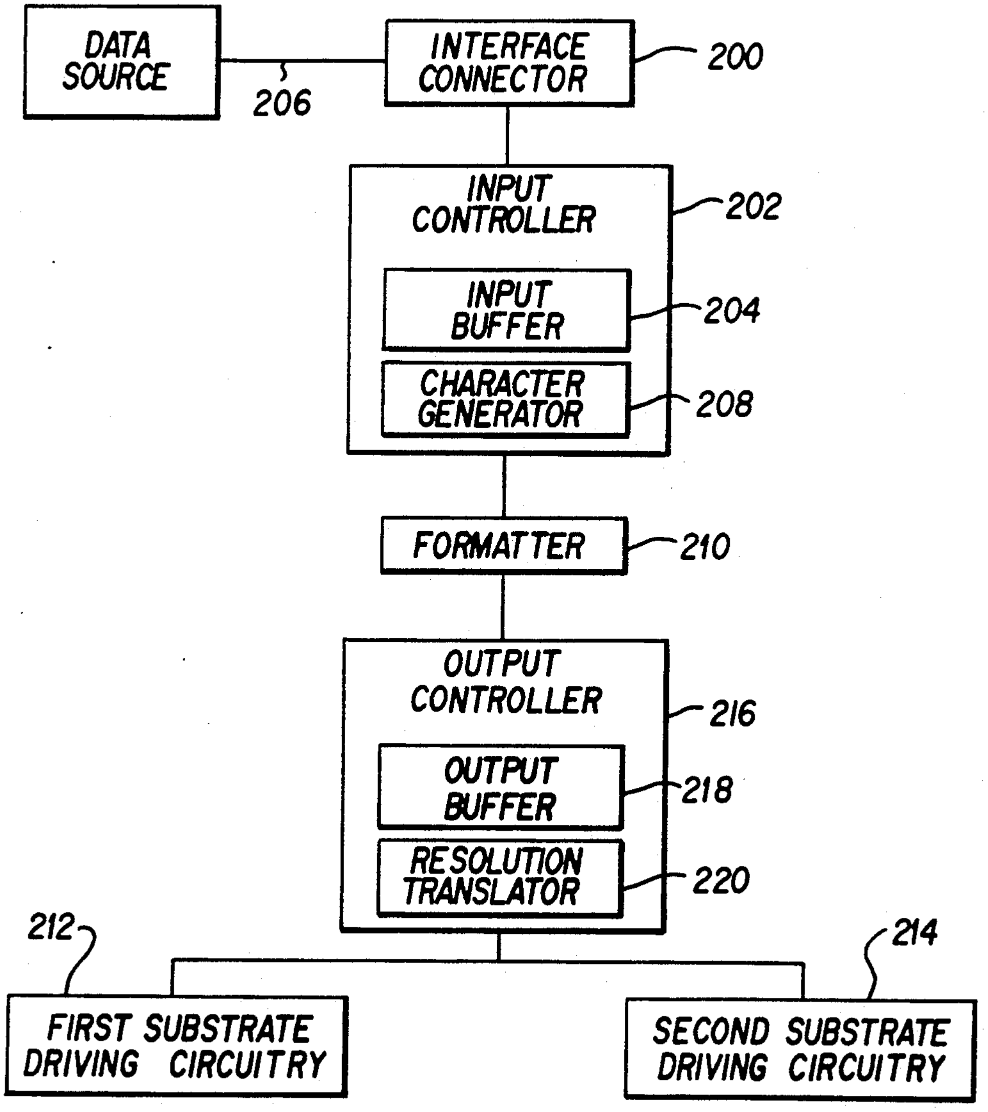
FIG. 7 is a data flow diagram for the devices of FIGS. 1A–C.

A data flow diagram for the device 10 of the preferred embodiment is shown in FIG. 7. The thermal recording device 10 can be connected to a variety of data sources using an interface connector 200 into a wall 32 of the body member 12 (see FIGS. 1A-1C). The device of the preferred embodiment contains a "Versatac compatible" interface. Signals from the data source transfer byte-parallel data or control codes to the interface, indicate whether the transfer is data or control information, reset the device 10, advance the recording medium 20, and perform handshaking functions.

All data, control and status signals from the data source connect to the interface connector 200 of the device 10, which in the preferred embodiment is a 37-pin, D-series subminiature connector (J1). Table 1 and FIG. 9 shows the pin assignments of the interface connector 200. Table 2 describes the active levels and operations of the interface signals. The interface signals are at positive transistor-transistor logic (TTL) levels. A complemented signal (for example READY) indicates that the line is active true when low. A non-complemented signal (for example PICLK) indicates that the line is active true when high.

TABLE 1

INTERFACE CONNECTOR PIN ASSIGNMENTS

| SIGNAL PIN | RETURN PIN | SIGNAL NAME | MNEMONIC |
|---|---|---|---|
| 1 | 20 | Input Bit 1 (LSB) | IN01 |
| 2 | 21 | Input Bit 2 | IN02 |
| 3 | 22 | Input Bit 3 | IN03 |
| 4 | 23 | Input Bit 4 | IN04 |
| 5 | 24 | Input Bit 5 | IN05 |
| 6 | 25 | Input Bit 6 | IN06 |
| 7 | 26 | Input Bit 7 | IN07 |
| 8 | 27 | Input Bit 8 (MSB) | IN08 |
| 9 | 28 | Clear | CLEAR |
| 10 | 29 | Parallel Input Clock | PICLK |
| 11 | 30 | Ready | READY |
| 12 | 31 | Print | PRINT |
| 13 | — | Not Connected | NC |
| 14 | 33 | Simultaneous Plot/Print | SPP |
| 15 | 34 | Remote Reset | RESET |
| 16 | 35 | Remote Form Feed | RFFED |
| 17 | 36 | Remote End of Transmission | REOTR |
| 18 | 37 | Remote Line Terminate | RLTER |
| 19 | 37 | No Paper | NOPAP |
| 20 | 37 | On-Line | ONLIN |

TABLE 2

INTERFACE SIGNAL DESCRIPTIONS

| SIGNAL MNEMONIC | SIGNAL NAME | ACTIVE LENGTH | OPERATION |
|---|---|---|---|
| | | DATA TRANSFER | |
| IN01-IN08 | Input Data Bits 1-8 | High | These lines enter one byte of data into the input buffer. Data must be accompanied by a PICLK pulse. |
| PICLK | Parallel Input Clock | High | This signal strobes a data byte present on lines IN01-IN08 into the input buffer. PICLK causes the plotter to go not ready for approximately 1 microsecond. PICLK must be a 300 ns minimum pulse. |
| READY | Plotter Ready | Low | A low level indicates the unit is ready to receive the next data byte or remote command. A high level indicates the unit is busy and will not accept data. |
| | | REMOTE FUNCTIONS | |
| CLEAR | Remote Clear | Low | This command clears the input when READY is low. READY remains high until the input buffer has been cleared. |
| RESET | Remote | Low | This command resets the unit and reinitiates all logic as long as this signal is asserted. READY remains high while RESET is asserted. |
| RLTER | Remote Line Terminate | Low | This command terminates the buffer currently being loaded, causes all previously loaded buffers to be output in sequence, then outputs the buffer just terminated in sequence. This command is ignored by the unit if received immediately after a full scan has been automatically terminated. |
| RFFED | Remote Form Feed | Low | This command terminates the buffer currently being loaded, causes all previously loaded buffers to be output in sequence, then outputs the buffer just terminated in sequence. Paper is advanced approximately eight |

TABLE 2-continued

| INTERFACE SIGNAL DESCRIPTIONS | | | |
|---|---|---|---|
| SIGNAL MNEMONIC | SIGNAL NAME | ACTIVE LENGTH | OPERATION |
| | | | inches. |
| REOTR | Remote End of Transmission | Low | This command terminates the buffer currently being loaded, causes all previously loaded buffers to be output in sequence, then outputs the buffer just terminated in sequence. After all data is written on the paper, it is advanced approximately eight inches. |
| | | STATUS | |
| ONLIN | On-line | Low | A low level indicates the unit is powered on, on-line is set to ON-LINE, and the interface cable is connected. A pull-up resistor must be provided by the user on this line to maintain a high level when power is off or the interface cable is disconnected. |
| NOPAP | No Paper | High | A high level indicates the paper supply is depleted. During an out-of-paper condition, the unit goes busy, outputs the current data and flashes the LED indicator. READY then remains busy. |
| | | MODE CONTROL | |
| PRINT | Print Mode | High | This line selects either print or plot operation. When high, print operation is selected. |
| SPP | Simultaneous Print/Plot Mode | Low | A low level selects the SPP mode where print and plot are overlain. |

All communications between the data source and the device 10 are controlled by an input controller 202 mounted on a PC board inside the device 10 and electrically connected to the interface connector 200. A READY line 206 (pin 11) provides status signals from the device 10 to the data source indicating whether the device 10 is ready to receive a data transfer. When READY is low, the device 10 can accept one byte of data on lines IN01–08.

A parallel input clock (PICLK) line provides a clock signal from the data source to the interface connector 200 at pin 10. This signal strobes one byte of data from the output port of the data source to the device interface at pins 1–8, and into an input 204 buffer of the input controller 202. Data is transferred to the device over an eight-bit parallel data bus 206. FIG. 10 shows the timing relationship for maxiumum data transfer.

The input buffer 204 stores one plot scan or one print line of data. The maximum number of 8-bit bytes per plot scan is 528 and the maximum number of characters per print line is 264. Note that there are 3968 active stylli in the printhead 28, which corresponds to 496 bytes per scan or 248 characters per line. Thus, for compatibility with the printhead 28, the last 32 bytes of an unterminated plot scan beyond 496 bytes are truncated. Similarly, the last 16 characters of an unterminated print line beyond 248 characters are truncated.

A plot scan or print line is automatically terminated by the input controller 202 when the number of bytes received is sufficient to complete the scan or line. A line is also terminated when the remote line terminate signal (RLTER) is asserted. The input controller 202 sets READY to high and thus the device 10 goes busy after receipt of each byte of data. The input controller 202 sets READY to high and the device 10 goes busy for longer periods during execution of the remote functions (see Table 1) and when the input buffer 204 is full.

The input controller 202 also receives a signal from the data source over the $\overline{\text{PRINT}}$ line (pin 10) or the simultaneous plot and print (SPP) line (pin 14) indicating which of three modes—plot, print, or simultaneous plot and print (SPP)—is to occur.

The device 10 of the preferred embodiment is equipped with a character generator 208 to be used in the print mode. The character generator is located in read only memory (ROM) (not shown) and can be grouped functionally with the input controller 202. It converts command or ASCII-coded characters to preprogrammed plot patterns. These patterns produce a pre-defined alphanumeric character set. The SPP mode allows overlaying of print characters with plot data, and also utilizes the character generator 208.

When the input buffer 204 has been loaded with one plot scan or print line of data, the input controller 202 transfers the data to a formatter 210 and a write cycle is initiated. The formatter 210 is specifically designed for each printhead 28. It translates the data into a format required by the respective driving circuitry 212 and 214 of substrates 100 and 102 of the printhead 28. Thus, a "1" or "0" is assigned to each stylus according to whether the stylus is to be energized or not for that print line.

The first and second substrates 100 and 102 comprising the printhead 28 retain their individual sets of driving circuitry 212 and 214, as previously discussed. Some of the stylli on the original substrates 100 and 102 are removed and some are rendered inoperative during the manufacturing process of the printhead 28. The formatter 210 is designed or programmed to properly assign the data received from the input buffer 204 to the respective stylli of the respective substrates 100 and 102. The formatter 210 may also be used to truncate data corresponding to inactive or destroyed stylli to the extent that this is not done by truncation of the data in the input controller 202.

After print characters have been generated and the data has been formatted, this data is provided to an output controller 216, where it is stored in an output buffer 218. The output controller 216 then strobes the data to the respective driving circuitry 212 and 214 of the first and second substrates 100 and 102. The stylli are activated by the data according to the conventional operation of the individual substrates 100 and 102, as summarized above.

The device 10 of the preferred embodiment also includes a resolution translator 220, which can be functionally grouped with the output controller 216. Some data sources are configured to generate data for low-resolution (100 dots/inch) raster scan plotter/printers. The resolution translator 220 converts these scans to high-resolution data which can be displayed at 8 dots/mm (203 dots/inch). Setting the internal resolution switch to HIGH causes the resolution translator 220 to replicate each bit in the output controller 216 and duplicate each scan line. This effectively doubles the dot size. Thus, the output of the output controller 216 is enlarged when plotted or printed.

The operation of the thermal recording device 10 is carried out in one of three principal modes—plot, print, and simultaneous plot and print. In the plot mode, the device 10 uses the raster scan method of plotting. One horizontal line (scan), consisting of a single row of dots, is written and the recording medium is incremented. Then another scan is written, and so forth. The scan is made up of a fixed number of bits. Each bit within the scan addresses an individual stylus in the printhead 28. By programming each scan, any type of graphic design can be outputed, including half-tone graphics and alphanumerics of any size. Plot patterns are generated one scan at a time. Each scan consists of a horizontal row of dots. Each dot position corresponds to one particular bit in the data stored in the input buffer 204. If a bit is a "1", a black dot is printed on the recording medium 20 in the position corresponding to the bit position in the input buffer 204. Input bit 8 (IN08) is the most significant bit (MSB) and addresses to the right-most writing bit of each byte. Input bit 1 (IN01) is the least significant bit (LSB). IN08 of the first byte transmitted addresses the first (left-most) stylus. IN01 of the last byte addresses the last stylus (rightmost) of the printhead.

In the print mode, print data in the form of an ASCII-coded character set is sent to the device from the data source one ASCII-coded byte at a time. When one complete print line is received or a print line is properly terminated, the input controller transfers the data to the character generator 208 which converts the ASCII-coded characters into plot patterns. The device 10 then automatically performs sixteen plot scans to generate the character line, followed by five blank interline spaces. Each character is generated by selectively plotting dots within a dot matrix. The character generator generates 21 scans per print line. Sixteen scans are preferably used for character generation. The formatter 210 automatically generates a space between each printed line. The standard line spacing is 5 scans (0.025 inches). The total number of scans and line spaces for each print line is therefore 21 scans totaling 0.105 inches. The normal character set includes 64 ASCII characters When in the print mode, the input buffer 204 is used to receive character data. This buffer has a one print line capacity. When the input buffer 204 receives the number of bytes necessary to print a full line or is terminated, a write cycle is automatically initiated by the input controller 202 causing the input buffer contents to be written to the character generator 208.

Print transfers are identical to plot transfers except writing times are different and print transfers can also use ASCII control codes. ASCII control codes are described in Table 3. These codes are functionally identical to the associated remote functions, which may also be used in the print mode.

With some minor modifications and exceptions, the device 10 can be interfaced to "Centronics compatible" data sources. In this case, PICLK may be used as "character strobe" and READY may be used as "busy." However, pin assignments are different and some control signals must be inverted.

TABLE 3

| | ACSII CONTROL CODES | |
|---|---|---|
| CONTROL | HEX CODE | OPERATION |
| EOT (End of Transmission | 04 | This control code is functionally identical to REOTR. It terminates input buffer and causes its contents to be OUTPUT. After all data is written on the paper, it is advanced approximately eight inches. |
| LF (Line Feed) | 0A | This control code is functionally identical to RLTER. It terminates the input buffer and causes its contents to be output. This command is ignored by the unit if received immediately after a full scan has been automatically terminated. The unit goes busy for a minimum of 1 microsecond after receipt of this command. |
| FF (Form Feed) | 0C | This control code is functionally identical to RFFED. It terminates the input buffer and causes its contents to be output. After all data is written on the paper, it is advanced approximately eight inches. . |
| CR (Carriage Return) | 0D | This control code performs the same function as the LF command, except it is honored only when used with a partially filled buffer. The CR code is ignored if it is received when the input buffer is full or empty. |

The SPP mode allows plotted and printed characters to be superimposed. This is accomplished by logically OR-ing print character lines with plot data scans, and then writing the OR-ed data as one scan. Note that one dot functions as part of the plot and also as part of the character. When in the SPP mode, the automatic print line spacing is disabled. Thus, if subsequent print lines are output while in the SPP mode, spaces between print lines must be software generated by issuing RLTER commands or outputting additional scans of plot data. Since a print line is generated by a number of plot scans, a sufficient number of plot scans must be sent to completely overlay the print. The preferred minimum number of plot scans per print line is 16. The data source must issue the required number of plot scans after each print line is transmitted in the SPP mode. After receipt of one print line, all subsequent data received is interpreted to be plot data until the required number of plot scans are received.

Additional advantages and modifications will be readily apparent to those skilled in the art. The invention in its broader aspects is, therefore, not limited to the specific details, representative apparatus and method, and illustrative examples shown and described. Accordingly, departures may be made from such details without departing from the spirit or scope of the general inventive concept as defined by the appended claims and their equivalents.

What is claimed is:

1. A wide format thermal printhead, comprising:

a baseplate;

a first printhead substrate having a print surface and a base surface opposite said print surface, said print surface including a print region and a border region surrounding said print region and adjacent to the periphery of said print surface, said print region including a plurality of substantially uniformly spaced active stylli, a portion of said border region being removed from a first longitudinal edge of said first substrate to form a second edge of said first substrate, a portion of said active stylli being substantially adjacent to said second edge of said first substrate, said base surface of said first substrate being mounted on said baseplate; and a second printhead substrate having a print surface and a base surface opposite said print surface, said print surface including a print region and a border region surrounding said print region and adjacent to the periphery of said print surface, said print region including a plurality of substantially uniformly spaced active stylli, a portion of said border being removed from a first longitudinal edge of said second substrate to form a second edge of said second substrate, a portion of said active stylli being substantially adjacent to said second edge of said second substrate, said base surface of said second substrate being mounted on said baseplate with said second edge of said second substrate abutting said second edge of said first substrate to form a printing surface having an extended width active print surface of substantially uniform stylli spacing.

2. A wide format thermal printhead as recited in claim 1, wherein:

the thermal printhead further comprises a power supply;

first substrate comprises first substrate driving circuitry for receiving data and selectively switching power from said power supply to selected ones of the stylli in accordance with the data; and the second substrate comprises second substrate driving circuitry for receiving data and selectively switching power from said power supply to selected ones of the stylli in accordance with the data.

3. A wide format thermal printhead as recited in claim 1, wherein:

said first substrate comprises a first power supply and first substrate driving circuitry for receiving data and selectively switching power from said first power supply to selected ones of the stylli in accordance with said data; and said second substrate comprises a second power supply and second substrate driving circuitry for receiving data and selectively switching power from said second power supply to selected ones of the stylli in accordance with the data.

4. A thermal recording device with wide format capabilities, comprising:

a body member;

a thermal printhead mounted in said body member, said printhead including, a baseplate, a first printhead substrate having a print surface and a base surface opposite said print surface, said print surface including a print region and a border region surrounding said print region and adjacent to the periphery of said print surface said print region including a plurality of substantially uniformly spaced active stylli, a portion of said border region being removed from a first longitudinal edge of said first substrate to form a second edge of said first substrate, a portion of said active stylli being substantially adjacent to said second edge of said first substrate, said base surface of said first substrate being mounted on said baseplate, and a second printhead substrate having a print surface and a base surface opposite said print surface, said print surface including a print region and a border region surrounding said print region and adjacent to the periphery of said print surface, said print region including a plurality of substantially uniformly spaced active stylli, a portion of said border being removed from a first longitudinal edge of said second substrate to form a second edge of said second substrate, a portion of said active stylli being substantially adjacent to said second edge of said second substrate, said base surface of said second substrate being mounted on said baseplate with said second edge of said second substrate abutting said second edge of said first substrate to form a printing surface having ~~an~~ extended width active print surface of substantially uniform stylli spacing;

device driving circuitry to receive data from a data source, translate the data into electrical signals, and provide the electrical signals to said first and second substrates to selectively energize the active stylli of said first and second substrates;

recording medium supply means mounted in said body member for supplying recording medium to said thermal printhead;

a platen roller mounted in said body member and having an outer surface for contacting said recording medium and applying a force to said recording medium to hold said recording medium against said thermal printhead; and recording medium feed means to move the recording medium across said thermal printhead.

5. A thermal recording device as recited in claim 4, wherein:

said thermal recording device further comprises a power supply;

said first substrate comprises first substrate driving circuitry for receiving data and selectively switching power from a power supply to selected ones of the stylli in accordance with the data; and said second substrate comprises second substrate driving circuitry for receiving data and selectively switching power from said power supply to selected ones of the stylli in accordance with the data.

6. A thermal recording device as recited in claim 4, wherein:

said first substrate comprises a first power supply and first substrate driving circuitry for receiving data and selectively switching power from said first power supply to selected ones of the stylli in accordance with data; and said second substrate comprises a second power supply and second substrate driving circuitry for receiving data and selectively switching power from said second power supply to selected ones of the stylli in accordance with the data.

7. A thermal recording device as recited in claim 4, wherein the driving circuitry comprises:

an input controller having an input buffer, said input controller being adapted to receive data from a data source and store the data in said input buffer;

a formatter for receiving the data from said input controller and translating the data into a format useable by the thermal printhead; and an output controller having an output buffer, said output controller being adapted to receive the formatted data from the formatter and to store the formatted data in said output buffer, said output controller further being adapted to strobe the formatted data from said output buffer to the first and second substrates.

8. A thermal recording device as recited in claim 7, wherein the input controller comprises a character generator for generating print characters when said thermal recording device is in print mode.

9. A thermal recording device as recited in claim 4, wherein said platen roller has a surface formed of an elastomeric material.

10. A thermal recording device as recited in claim 9, wherein the elastomeric material comprises a rubber material.

11. A thermal recording device as recited in claim 4, wherein the recording medium driving means comprises:

a stepping motor mounted in said body member; and mechanical coupling means for coupling said stepping motor with the platen roller to incrementally and controllably move the recording medium across the thermal printhead.

12. A wide format thermal printhead as recited in claim 1, wherein said baseplate comprises a solid material with high electrical and thermal resistivity.

13. A wide format thermal printhead as recited in claim 1, wherein the linear and volumetric expansivity of said baseplate and said first and said second substrates are substantially identical.

14. A wide format thermal printhead as recited in claim 1, wherein said baseplate comprises at least one of a porcelain and a ceramic wafer.

15. A wide format thermal printhead as recited in claim 1, wherein at least one of said first and said second substrates is mounted to said baseplate using at least one of an epoxy, a cement, fastening screws, and a double-sided adhesive tape.

* * * * *

UNITED STATES PATENT AND TRADEMARK OFFICE
CERTIFICATE OF CORRECTION

PATENT NO. : 5,028,935

DATED : July 2, 1991

INVENTOR(S) : Ralph E. Warmack et al.

It is certified that error appears in the above-identified patent and that said Letters Patent is hereby corrected as shown below:

At block [73] on the cover page of the patent change the Assignee from "Calcomp Group, Sanders Associates, Inc." to -- Calcomp Inc. --.

Claim 4, col. 18, line 16, after "surface" insert a comma -- , --.

Signed and Sealed this

Sixteenth Day of February, 1993

*Attest:*

STEPHEN G. KUNIN

*Attesting Officer*

*Acting Commissioner of Patents and Trademarks*